(12) United States Patent
Borowicz

(10) Patent No.: US 11,046,532 B1
(45) Date of Patent: Jun. 29, 2021

(54) FLEXIBLE DUAL-SIDED VACUUM PLATE CARRIER

(71) Applicant: The Boeing Company, Chicago, IL (US)

(72) Inventor: Clifford D. Borowicz, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/786,498

(22) Filed: Feb. 10, 2020

(51) Int. Cl.
*B65G 47/91* (2006.01)
*B64C 7/00* (2006.01)
*B65G 17/12* (2006.01)

(52) U.S. Cl.
CPC ............... *B65G 47/91* (2013.01); *B64C 7/00* (2013.01); *B65G 17/12* (2013.01); *B65G 2201/0294* (2013.01)

(58) Field of Classification Search
CPC .............................. B65G 47/91; B65G 17/12; B65G 2201/0294; B65G 47/848; B64C 7/00; B07C 3/082
USPC .......................... 198/428, 471.1, 477.1, 689.1
See application file for complete search history.

(56) References Cited

U.S. PATENT DOCUMENTS

| | | | | |
|---|---|---|---|---|
| 5,168,645 A | * | 12/1992 | Robin | D06F 95/00 38/143 |
| 5,902,449 A | * | 5/1999 | Moore | B65C 3/16 156/249 |
| 9,027,736 B2 | * | 5/2015 | Lanfranchi | B65G 29/00 198/475.1 |
| 10,287,118 B2 | * | 5/2019 | Persson | B65B 43/185 |

FOREIGN PATENT DOCUMENTS

DE 102012102265 A1 * 9/2013 .......... B25J 15/0691

OTHER PUBLICATIONS

CN-206590569-U, Oct. 2017, Tao Xiaoliang, (Year: 2017).*

* cited by examiner

*Primary Examiner* — Gene O Crawford
*Assistant Examiner* — Lester Rushin, III
(74) *Attorney, Agent, or Firm* — Parsons Behle & Latimer

(57) ABSTRACT

A composite panel tooling system may include a forming platform having a contoured surface configured to support a layup of composite material to form a contoured composite part. The system may further include a flexible carrier removably disposed on the contoured surface and comprising a frame, where the frame is configured to receive a set of double-sided vacuum grippers within a set of apertures defined within the frame, and where each double-sided vacuum gripper of the set of double-sided vacuum grippers is configured to connect to a pneumatic system to induce a vacuum on a first side of each vacuum gripper for gripping the contoured surface and on a second side of each vacuum gripper for gripping a surface of the contoured composite part after the contoured composite part has been formed.

20 Claims, 8 Drawing Sheets

FLEXIBLE DUAL-SIDED VACUUM PLATE CARRIER

FIELD OF THE DISCLOSURE

This disclosure is generally related to the field of composite layup mandrel tools and, in particular, to a flexible dual-sided vacuum plate carrier for holding a molded part to a layup mandrel tool.

BACKGROUND

Manufacturing composite assemblies includes several steps, such as laying plies against a layup mandrel, curing the plies, inspecting and scanning the cured plies, machining the newly formed part for assembly, and assembling the part. During each process, the part must be positioned somewhere on a production floor. Having individual tools and areas for post-cure processes, such as inspecting and scanning new parts, may substantially increase the production area footprint for manufacturing composite parts. A large tooling footprint may contribute to the cost of producing completed products, particularly when the parts are large, such as in the field of aircraft or other large vehicles.

Assembling parts, particularly in the field of aircraft, may require precise dimensions and accuracy. As an example, a typical aircraft component may require a root-mean-square of 0.002 inches global accuracy. This accuracy may be difficult to achieve using composite parts because, once removed from the layup mandrel, the parts may be subject to some flexing and/or deformation. During assembly a post-cure scanning process is typically used to map a surface of a composite panel and stringer to be attached to the panel. The scan can be used to determine an amount of sacrificial shimming required for a panel-to-rib interface. The shimming requires additional time and resources to assemble parts, which may also increase costs associated with production. In addition to necessitating shimming, the post-cure flexing and deforming may reduce the accuracy of machined portions of the part, such as drilled holes.

SUMMARY

Described is a flexible carrier tool that can be applied between a layup mandrel and a cured composite part. The flexible carrier tool may secure the composite part to the layup mandrel preventing flexing or deformation during post-cure processes. By converting a layup mandrel tool into a post-cure processes tool, the utility of existing tools may be increased and a too footprint in factory may be reduced. Further, flexing and deformation may be reduced as compared to typical post-cure processes resulting in shimless, or reduced shimming, and in greater accuracy in machining.

In an embodiment, a composite panel tooling system includes a forming platform having a contoured surface configured to support a layup of composite material to form a contoured composite part. The system further includes a flexible carrier removably disposed on the contoured surface and comprising a frame, where the frame is configured to receive a set of double-sided vacuum grippers within a set of apertures defined within the frame, and where each double-sided vacuum gripper of the set of double-sided vacuum grippers is configured to connect to a pneumatic system to induce a vacuum on a first side of each vacuum gripper for gripping the contoured surface and on a second side of each vacuum gripper for gripping a surface of the contoured composite part after the contoured composite part has been formed.

In some embodiments, the frame comprises a pair of side members and a set of intercostal members spanning between the pair of side members. In some embodiments, positions of the intercostal members correspond to predetermined joint locations along the contoured composite part. In some embodiments, the set of apertures includes multiple apertures defined within the pair of side members and within the set of intercostal members. In some embodiments, the set of apertures are evenly spaced along the pair of side members and the set of intercostal members. In some embodiments, the frame substantially spans the contoured surface. In some embodiments, each double-sided vacuum gripper of the set of double-sided vacuum grippers includes a first vacuum circuit on the first side and a second vacuum circuit on the second side, where the first vacuum circuit is isolated from the second vacuum circuit. In some embodiments, the contoured composite part is a part of an aircraft.

In an embodiment, a composite panel tooling method includes supporting a layup of composite material at a forming platform having a contoured surface to form a contoured composite part. The method further includes positioning a flexible carrier on the contoured surface, the flexible carrier including a frame. The method also includes receiving a set of double-sided vacuum grippers within a set of apertures defined within the frame. The method includes connecting each double-sided vacuum gripper of the set of double-sided vacuum grippers to a pneumatic system. The method further includes inducing a vacuum on a first side of each vacuum gripper to grip the contoured surface and on a second side of each vacuum gripper to grip a surface of the contoured composite part after the contoured composite part has been formed.

In some embodiments, the frame includes a pair of side members and a set of intercostal members spanning between the pair of side members. In some embodiments, the method further includes forming joints at locations along the contoured composite part that correspond to positions of the intercostal members. In some embodiments, the set of apertures includes multiple apertures defined within the pair of side members and multiple apertures defined within the set of intercostal members. In some embodiments, the set of apertures are evenly spaced along the pair of side members and the set of intercostal members. In some embodiments, the frame substantially spans the contoured surface. In some embodiments, each double-sided vacuum gripper of the set of double-sided vacuum grippers includes a first vacuum circuit on the first side and a second vacuum circuit on the second side, where the first vacuum circuit is isolated from the second vacuum circuit. In some embodiments, the contoured composite part is a part of an aircraft. In some embodiments, the method includes performing an assembly operation on the contoured composite part while the contoured composite part is being gripped by the vacuum grippers.

In an embodiment, a flexible carrier includes a frame having a pair of side members and a set of intercostal members spanning between the pair of side members, where the frame is configured to receive a set of double-sided vacuum grippers within a set of apertures defined within the frame, and where each double-sided vacuum gripper of the set of double-sided vacuum grippers is configured to connect to a pneumatic system to induce a vacuum on a first side of each vacuum gripper for gripping a contoured surface of a forming platform and on a second side of each vacuum gripper for gripping a surface of a composite part after the composite part has been formed. In some embodiments, the frame is cut from a single carbon slip sheet.

Figure 1:
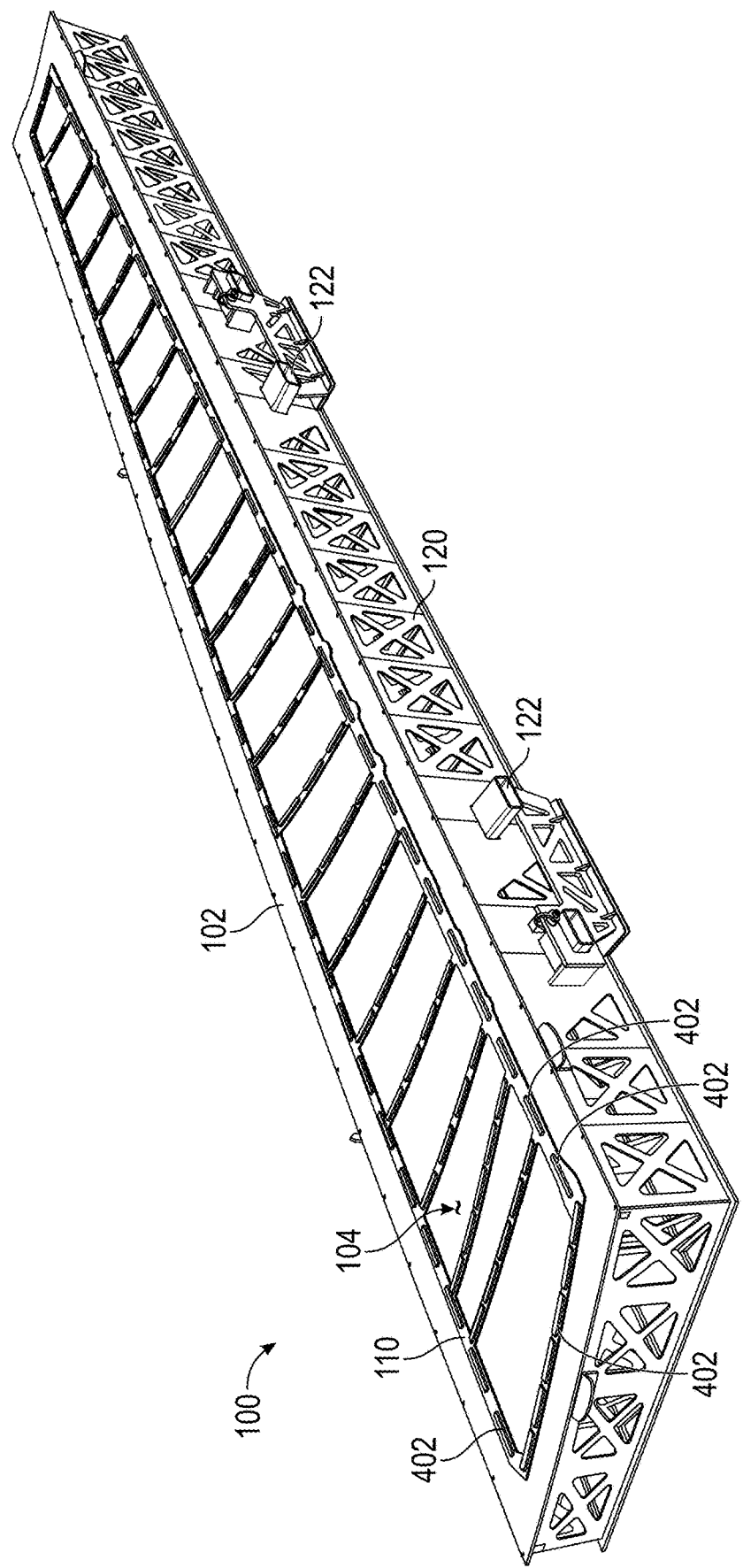
FIG. 1 depicts an embodiment of a composite panel tooling system and an embodiment of a flexible carrier.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

Referring to FIG. 1, an embodiment of a composite panel tooling system 100 is depicted. The system 100 may include a forming platform 102 and a flexible carrier 110. The specific example in FIG. 1 is directed toward a tooling system for forming a stabilizer of an aircraft. However, the described systems and methods may be applied to the formation of any composite parts, such as for any vehicles, and is not limited to any particular application.

The forming platform 102 may have a contoured surface 104 configured to support a layup of composite material. It may be supported by a truss system 120 that ensures the proper shape of the contoured surface. The truss system 120 may also raise the level of the forming platform 102 to provide workers with ready access to a layup. Various access points 122 may also be positioned within the support truss system 120 to provide, among other systems, vacuum access to ensure uniformity throughout the formed part.

The flexible carrier 110 may be removably disposed on the contoured surface 104. By flexing, the flexible carrier 110 may conform to the contoured surface 104 and may be configured to pneumatically grip the contoured surface 104. For example, the flexible carrier 110 may include at least one double-sided vacuum gripper 402. While one side of the at least one double-sided gripper 402 may grip the contoured surface 104, the other side may grip a formed and cured part, thereby securing the part to the contoured surface 104. In practice, the flexible carrier 110 may include many vacuum grippers in order to uniformly hold a part. Further, as depicted in FIG. 1, the flexible carrier 110 may substantially span the contoured surface 104 so as to secure the part along its entire length. As used herein, the term "substantially" means that the flexible carrier spans the entire contoured surface 104 minus a small margin at the edge at which no significant flexing occurs in a formed and cured layup. The flexible carrier 110 is further described herein.

Having individual tools and areas on an assembly floor for post-cure processes, such as inspecting and scanning new parts for defects, may substantially increase the production area footprint for manufacturing composite parts. The flexible carrier 110 may enable the forming platform 102 to be reused to hold a composite part during subsequent processes, thereby reducing the overall footprint required for production.

Figure 2:
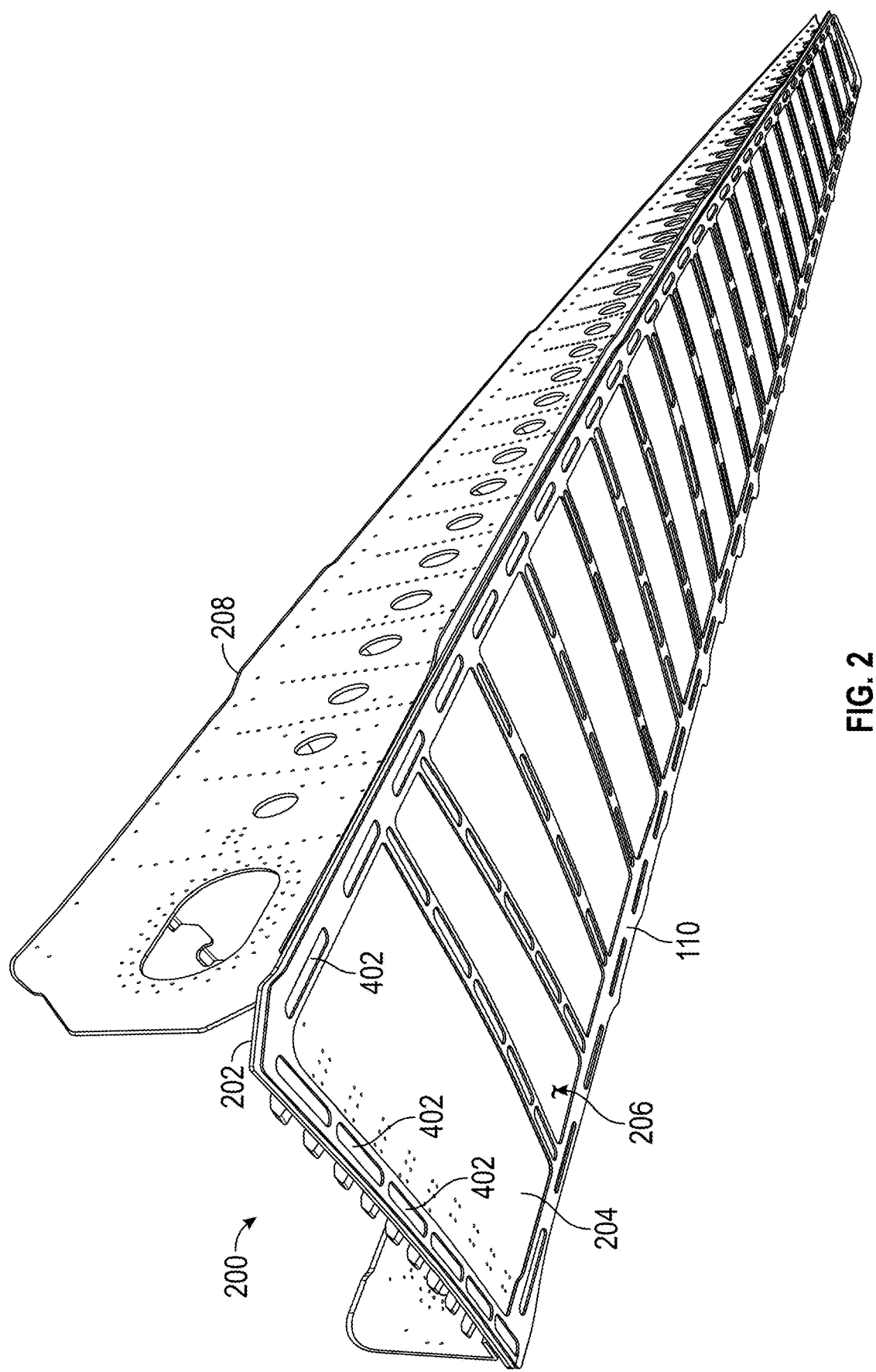
FIG. 2 depicts an embodiment of a composite part assembly and the embodiment of the flexible carrier.

Referring to FIG. 2, an embodiment of a composite part assembly 200 is depicted. The composite part assembly 200 may include a composite part 204 formed from a layup 202 of composite material. In the example shown in FIG. 2, the composite part 204 may be a lower outer skin of a control surface of an aircraft. The composite part assembly 200 may also include at least one additional part 208 attached to the composite part 204. For example, the at least one additional part 208 may be a stringer, or other lateral structure attached to the composite part 204. Although FIG. 2 depicts the composite part 204 as being part of an aircraft, the disclosed systems and methods are not limited to aircraft. Other applications are possible.

FIG. 2 also depicts the flexible carrier 110 removably disposed on a surface 206 of the composite part 204. The at least one double-sided vacuum gripper 402 may be configured to secure the flexible carrier 110 against the surface 206 on one side, while also securing the flexible carrier 110 against the contoured surface 104 of FIG. 1 on the other side.

Figure 3:
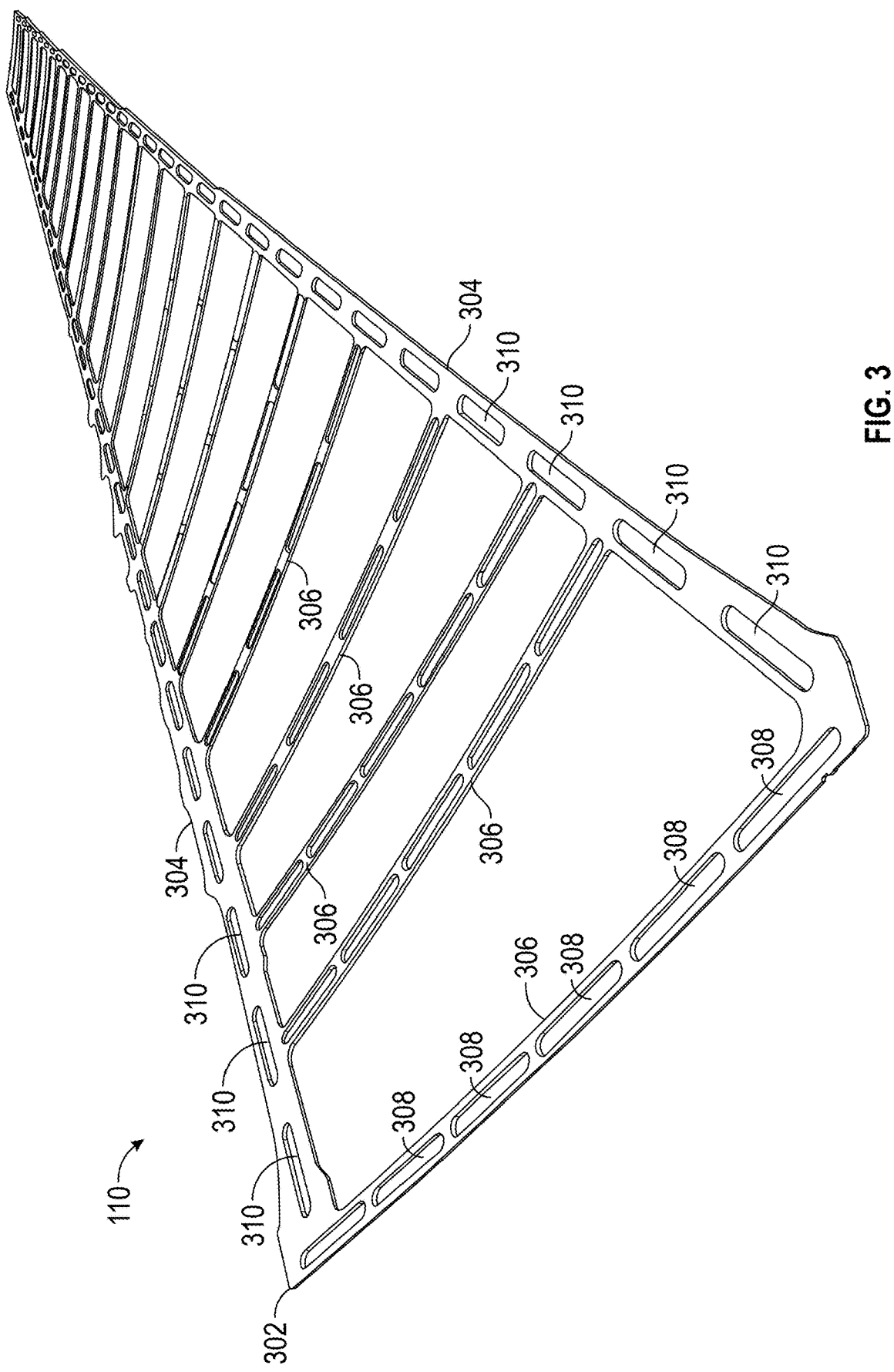
FIG. 3 depicts an embodiment of a flexible carrier.

Referring to FIG. 3, an embodiment of a flexible carrier 110 is depicted. The flexible carrier 110 may include a frame 302. The frame 302 may include a set of apertures 308, 310 defined therein. The apertures 308, 310 may be configured to receive a set of double-sided vacuum grippers therein. The frame 302 may include a pair of side members 304 and a set of intercostal members 306 spanning between the pair of side members 304. The positions of the intercostal members 306 may correspond to predetermined joint locations associated with stringers along a contoured composite part. The frame 302 may be formed by cutting a single composite slip sheet according to a pattern. Various cutting processes may be used including, but not limited to, a water jet cutting process.

In order to hold a part securely, the set of apertures 308, 310 may include multiple apertures 310 defined within the pair of side members 304 and multiple apertures 308 defined within the set of intercostal members 306. The set of apertures 308, 310 may be evenly spaced along the pair of side members 304 and the set of intercostal members 306. The frame 302 may substantially span the contoured surface 104 (shown in FIG. 1) in order to securely hold a part.

Figure 4:
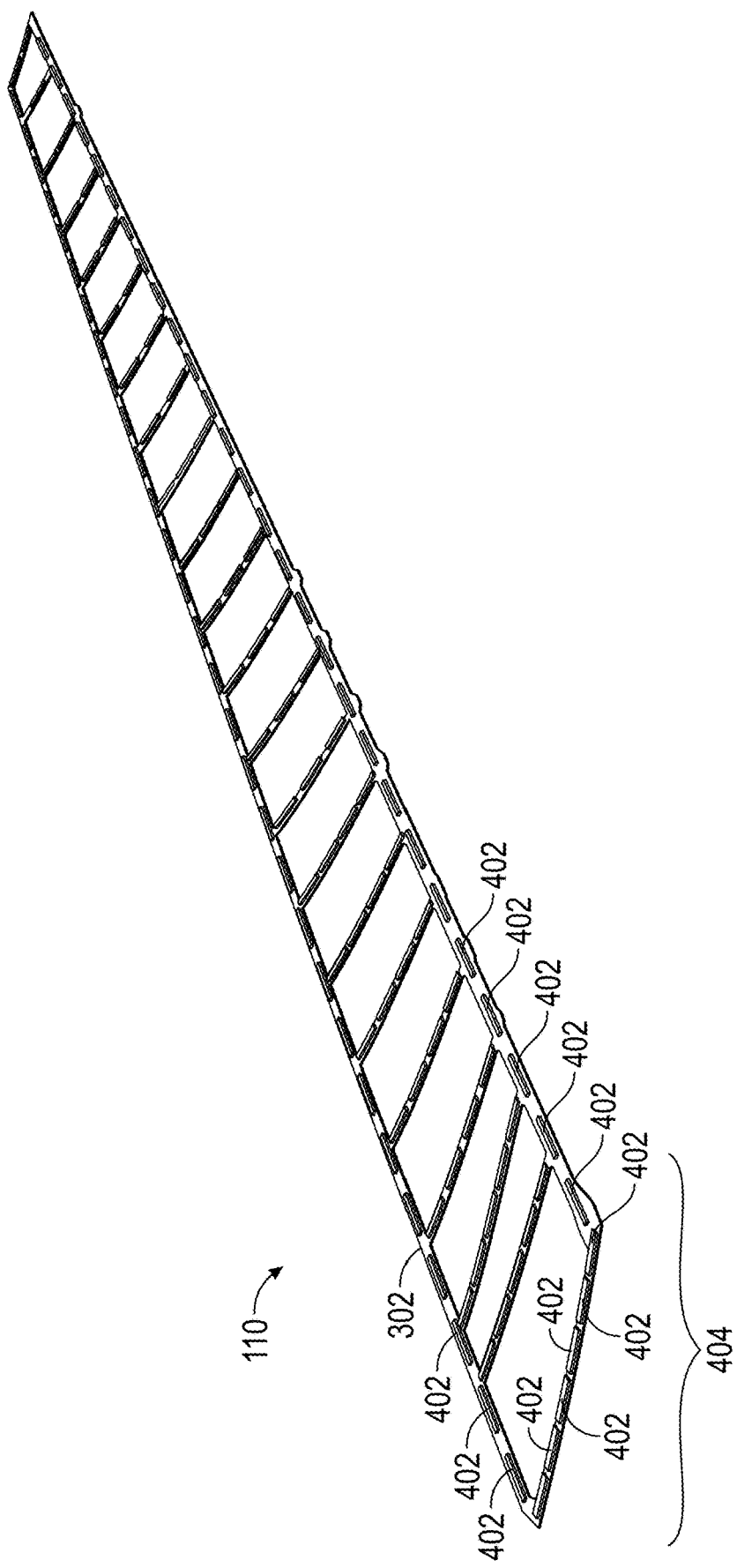
FIG. 4 depicts an embodiment of a flexible carrier having double-sided vacuum grippers installed.

Referring to FIG. 4, an embodiment of a flexible carrier 110 is depicted. FIG. 4 also depicted a set of double-sided vacuum grippers 404. Each vacuum gripper 402 may be deposited within the apertures within the frame 302. The set of vacuum grippers 404 may be configured to grip surfaces on both sides of the flexible carrier 110 when activated. For example, each double-sided vacuum gripper 402 may be configured to grip the contoured surface 104 (shown in FIG. 1) on one side and to grip the surface 206 of the composite part 204 (shown in FIG. 2) on the other side.

Figure 5:
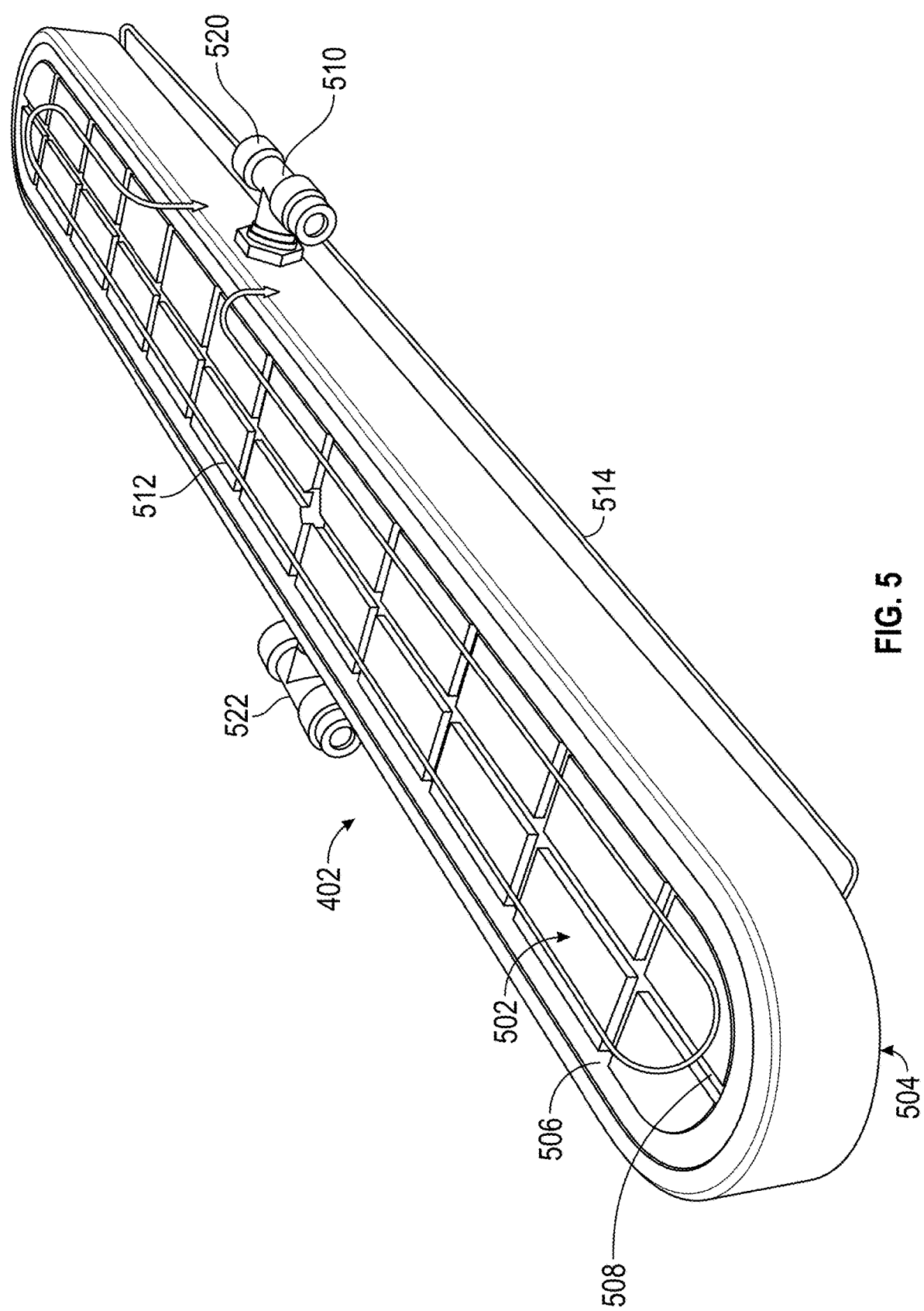
FIG. 5 depicts an embodiment of a double-sided vacuum gripper.

Referring to FIG. 5, an embodiment of a double-sided vacuum gripper 402 is depicted. The double-sided vacuum gripper 402 may be configured to connect to a pneumatic system 520 to induce a vacuum on a first side 502 of the vacuum gripper 402 for gripping a contoured surface of a layup tool and on a second side 504 of the vacuum gripper 402 for gripping a surface of a contoured composite part. A seal 506 may run along a perimeter of the vacuum gripper 402 to generate a vacuum against a surface when the pneumatic system 520 is activated. A channel 508 within the vacuum gripper 402 may be in fluid communication with a connective component 510 such as a valve. The pneumatic system 520 may be connected to the connective component 510 and, upon activation, may cause a pressure differential to be generated, thereby forming the vacuum when the seal 506 is pressed against a surface. A similar channel may exist on the second side 504 of the vacuum gripper 402 and may be in fluid communication with a second connective component 522.

During operation, the double-sided vacuum gripper 402 may create a first vacuum circuit 512 on the first side 502 and a second vacuum circuit 514 on the second side 504. The first vacuum circuit 512 may be isolated from the second vacuum circuit 514 so that each of the vacuum circuits 512, 514 may be activated independently. In this way, surfaces may be gripped and released independently.

Figure 6:
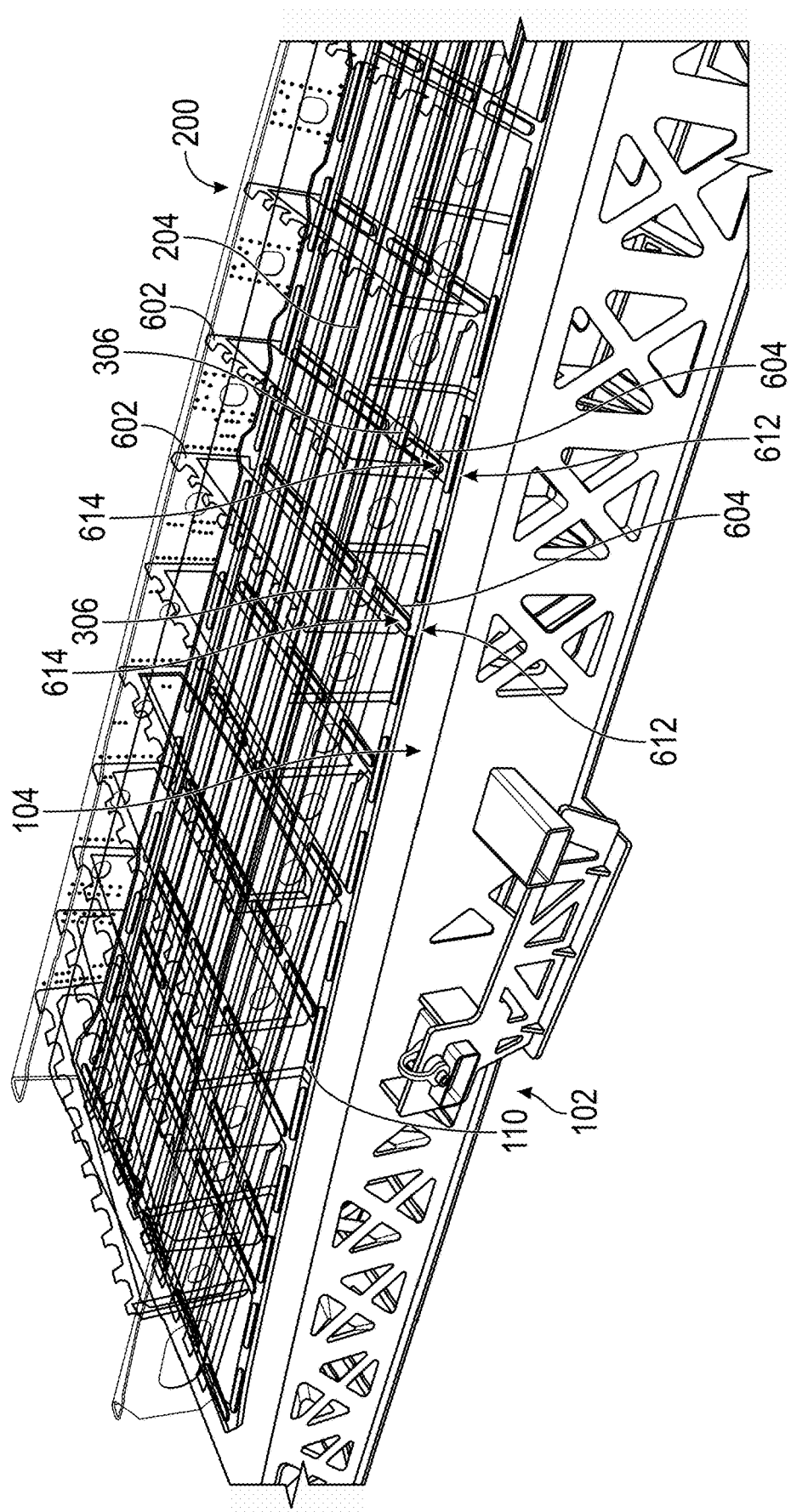
FIG. 6 depicts an embodiment of a flexible carrier between a forming platform and a composite part assembly.

Referring to FIG. 6, an embodiment of a flexible carrier 110 is depicted between a forming platform 102 and a composite part assembly 200. The composite part assembly 200 is depicted as being transparent in order to show the flexible carrier 110. As shown in FIG. 6, positions 612 of the intercostal members 306 of the flexible carrier 110 may correspond to predetermined joint locations 614 along the contoured composite part 204. The joint locations 614 may correspond to joints 604 between the composite part 204 and lateral parts 602 within the composite part assembly 200.

By ensuring that the positions 612 of the intercostal members 306 correspond to the predetermined joint locations 614, the flexible carrier 110 may provide support for forming the joints 604 by holding the composite part 204 against the contoured surface 104 of the forming platform 102 at the precise location of each of the joints 604. This may prevent deformation and/or flexing of the composite part 204 while the joints 604 are being created during the manufacturing process. By reducing the deformation and flexing, some post-cure processing and tooling may be eliminated. Further, by using the forming platform 102 as a support underneath the flexible carrier 110, additional tooling may be eliminated to reduce the tooling footprint.

Figure 7A:
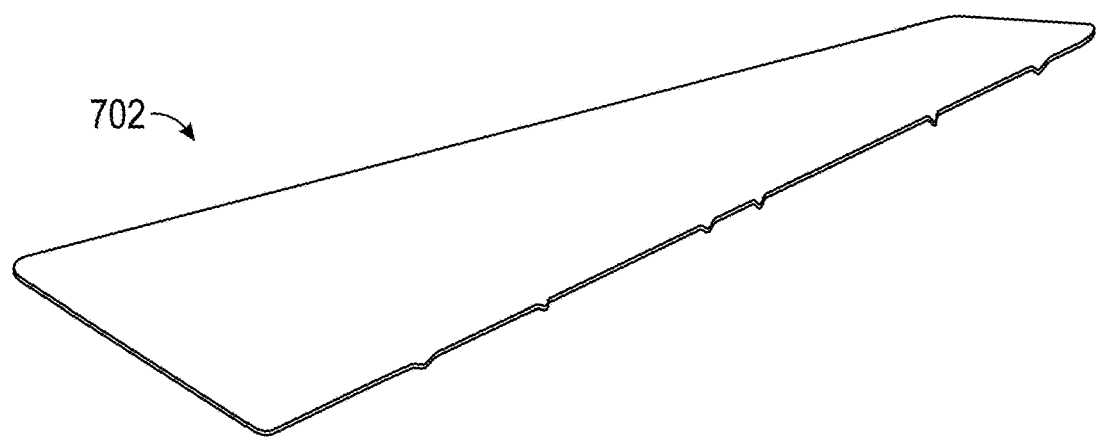
FIG. 7A depicts a slip sheet for forming a flexible carrier.
Figure 7B:
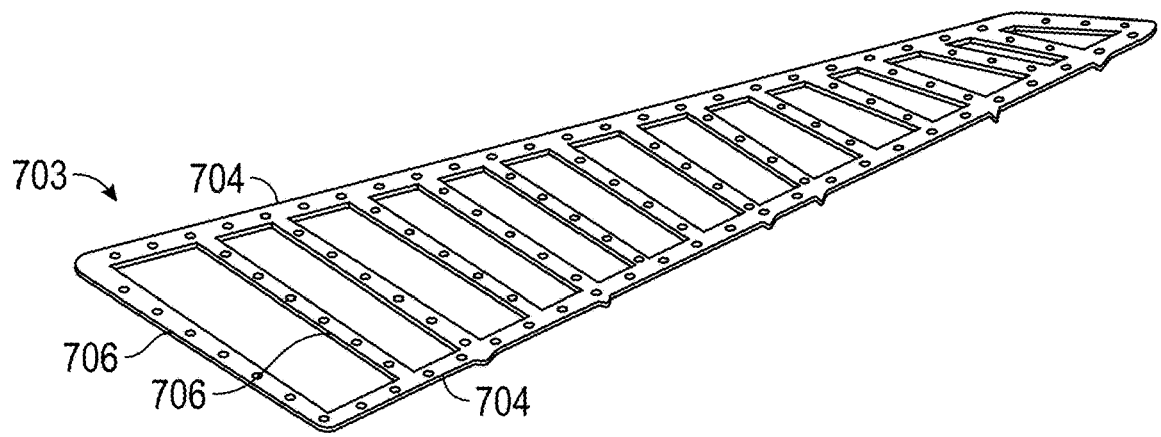
FIG. 7B depicts a frame cut from a slip sheet.

FIGS. 7A-7B illustrate the formation of an embodiment of the flexible carrier 110. Referring to FIG. 7A, a slip sheet 702 is depicted. The slip sheet 702 may include a carbon composite material and may be a single carbon slip sheet. It may be formed and cured on a contoured surface on which it will later be used as a flexible carrier, such as the contoured surface 104. In some embodiments, the slip sheet 702 may include a flexible material so as to conform to a contoured surface without being cured to hold any particular shape.

Referring to FIG. 7B, the slip sheet 702 is depicted after a cutting operation and defines a frame 703. The cutting operation may include a water jet cutting operation performed by a water jet cut tool. Other types of cutters, including mechanical cutters, stamps, templates, etc., may also be used. The frame 703 may include side members 704 with intercostal members 706 positioned laterally between the side members 704. The frame 703 may correspond to the frame 302 of FIG. 3. Although the frame 703 includes two side members 704 and many intercostal members 706, in other embodiments, depending on the part being manufactured, other configurations are possible.

Figure 7C:
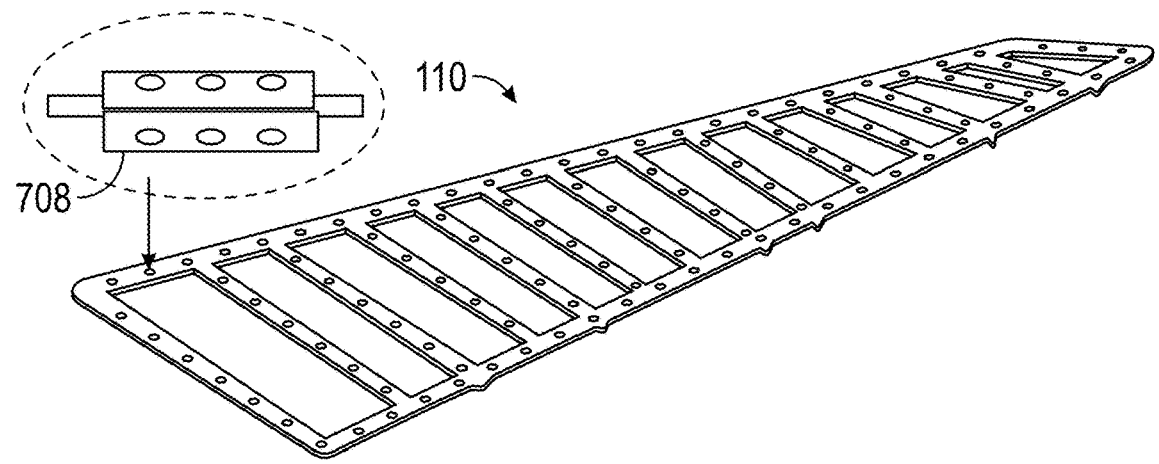
FIG. 7C depicts a flexible carrier formed by adding vacuum grippers to a frame.

Referring to FIG. 7C, double-sided vacuum grippers 708 have been added to the frame 703 to form a flexible carrier 110. For example, the double-sided vacuum grippers 708 may correspond to the double-sided vacuum gripper 402 and may be used to grip surfaces on both sides of the flexible carrier 110.

Figure 8:
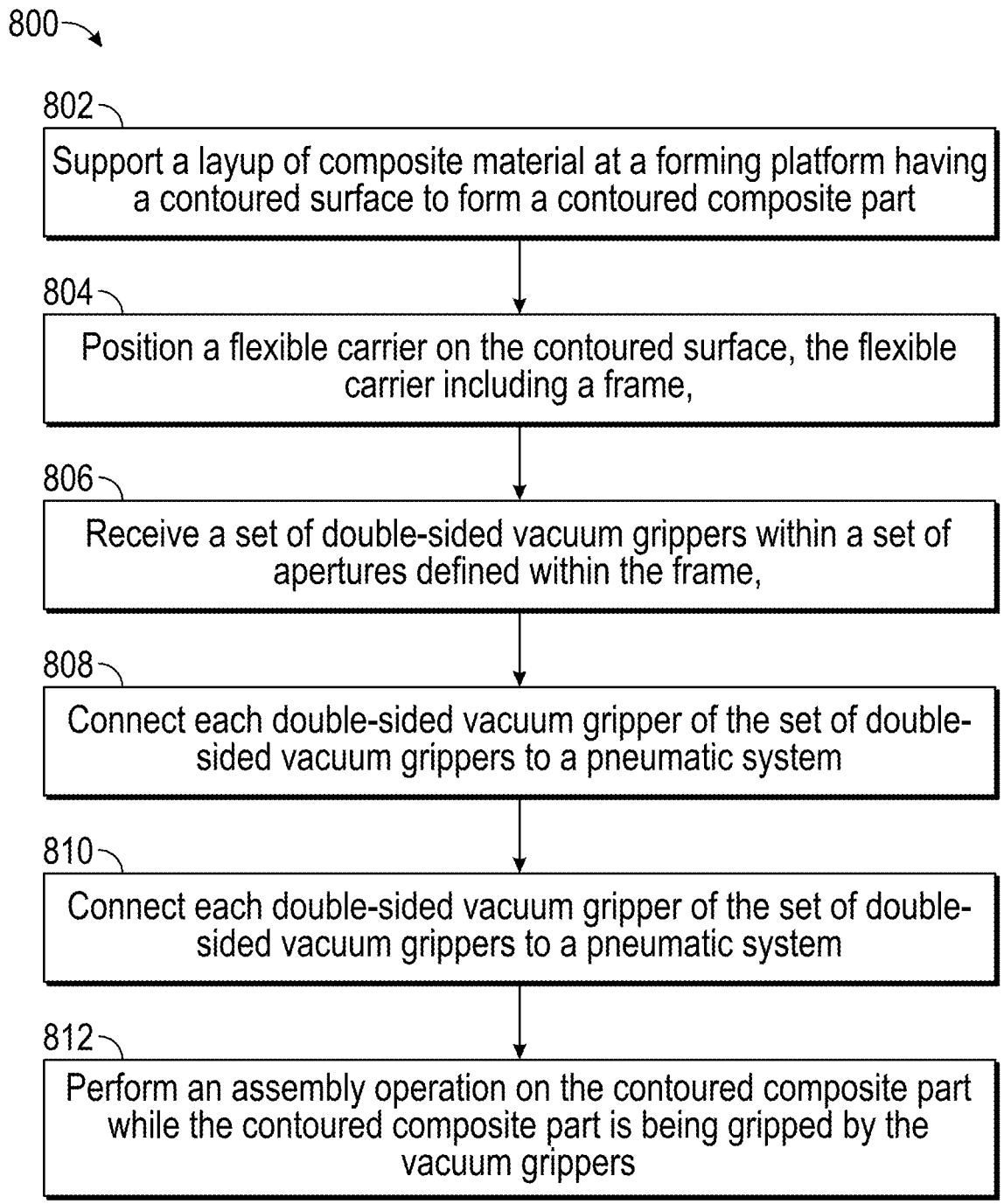
FIG. 8 depicts an embodiment of a composite panel tooling method.

Referring to FIG. 8, a composite panel tooling method 800 is depicted. The method 800 may include supporting a layup of composite material at a forming platform having a contoured surface to form a contoured composite part, at 802. For example, the layup 202 may be supported at the forming platform 102 on the contoured surface 104 to form the composite part 204.

The method 800 may further include positioning a flexible carrier on the contoured surface, the flexible carrier including a frame, at 804. For example, the flexible carrier 110 may be positioned on the contoured surface 104.

The method 800 may also include receiving a set of double-sided vacuum grippers within a set of apertures defined within the frame, at 806. For example, the set of double-sided vacuum grippers 404 may be inserted into the set of apertures 308, 310 defined within the frame 302.

The method 800 may include connecting each double-sided vacuum gripper of the set of double-sided vacuum grippers to a pneumatic system, at 808. For example, each double-sided vacuum gripper 402 may be connected to the pneumatic system 520.

The method 800 may further include inducing a vacuum on a first side of each vacuum gripper to grip the contoured surface and on a second side of each vacuum gripper to grip a surface of the contoured composite part after the contoured composite part has been formed, at 810.

The method 800 may also include performing an assembly operation on the contoured composite part while the contoured composite part is being gripped by the vacuum grippers, at 812. For example, the vacuum grippers 402 may hold the composite part 204 while an assembly operation, such as drilling pilot holes or attaching additional parts, is performed on the composite part 204.

Although various embodiments have been shown and described, the present disclosure is not so limited and will be understood to include all such modifications and variations as would be apparent to one skilled in the art.

What is claimed is:

1. A composite panel tooling system comprising:
   a forming platform having a contoured surface configured to support a layup of composite material to form a contoured composite part;
   a flexible carrier removably disposed on the contoured surface and comprising a frame, wherein the frame substantially spans the contoured surface, wherein the frame is configured to receive a set of double-sided vacuum grippers within a set of apertures defined within the frame, wherein each double-sided vacuum gripper of the set of double-sided vacuum grippers is configured to connect to a pneumatic system to induce a vacuum on a first side of each double-sided vacuum gripper for gripping the contoured surface and on a second side of each double-sided vacuum gripper for gripping a surface of the contoured composite part after the contoured composite part has been formed.

2. The system of claim 1, wherein the frame comprises a pair of side members and a set of intercostal members spanning between the pair of side members.

3. The system of claim 2, wherein positions of each intercostal member of the set of intercostal members correspond to predetermined joint locations along the contoured composite part.

4. The system of claim 2, wherein the set of apertures includes a multiple apertures defined within the pair of side members and within the set of intercostal members.

5. The system of claim 2, wherein the set of apertures are evenly spaced along the pair of side members and the set of intercostal members.

6. The system of claim 1, wherein each double-sided vacuum gripper of the set of double-sided vacuum grippers includes a first vacuum circuit on the first side and a second vacuum circuit on the second side, wherein the first vacuum circuit is isolated from the second vacuum circuit.

7. The system of claim 1, wherein the contoured composite part is a part of an aircraft.

8. A composite panel tooling method comprising:
supporting a layup of composite material at a forming platform having a contoured surface to form a contoured composite part;
positioning a flexible carrier on the contoured surface, the flexible carrier including a frame, wherein the frame comprises a pair of side members and a set of intercostal members spanning between the pair of side members;
receiving a set of double-sided vacuum grippers within a set of apertures defined within the frame;
connecting each double-sided vacuum gripper of the set of double-sided vacuum grippers to a pneumatic system;
inducing a vacuum on a first side of each double-sided vacuum gripper to grip the contoured surface and on a second side of each double-sided vacuum gripper to grip a surface of the contoured composite part after the contoured composite part has been formed.

9. The method of claim 8, further comprising:
forming joints at locations along the contoured composite part that correspond to positions of each of the intercostal members of the set of intercostal members.

10. The method of claim 8, wherein the set of apertures includes multiple apertures defined within the pair of side members and multiple apertures defined within the set of intercostal members.

11. The method of claim 8, wherein the set of apertures are evenly spaced along the pair of side members and the set of intercostal members.

12. The method of claim 8, wherein the frame substantially spans the contoured surface.

13. The method of claim 8, wherein each double-sided vacuum gripper of the set of double-sided vacuum grippers includes a first vacuum circuit on the first side and a second vacuum circuit on the second side, wherein the first vacuum circuit is isolated from the second vacuum circuit.

14. The method of claim 8, wherein the contoured composite part is a part of an aircraft.

15. The method of claim 8, further comprising:
performing an assembly operation on the contoured composite part while the contoured composite part is being gripped by the double-sided vacuum grippers.

16. A flexible carrier comprising:
a frame having a pair of side members and a set of intercostal members spanning between the pair of side members, wherein the frame is configured to receive a set of double-sided vacuum grippers within a set of apertures defined within the frame,
wherein each double-sided vacuum gripper of the set of double-sided vacuum grippers is configured to connect to a pneumatic system to induce a vacuum on a first side of each double-sided vacuum gripper for gripping a contoured surface of a forming platform and on a second side of each double-sided vacuum gripper for gripping a surface of a composite part after the composite part has been formed.

17. The flexible carrier of claim 16, wherein the frame substantially spans the contoured surface of the forming platform.

18. The flexible carrier of claim 16, wherein the frame is cut from a single carbon slip sheet.

19. The flexible carrier of claim 16, wherein positions of each intercostal member of the set of intercostal members correspond to predetermined joint locations along a contoured composite part.

20. The flexible carrier of claim 16, wherein the set of apertures includes a multiple apertures defined within the pair of side members and within the set of intercostal members.

* * * * *